Dec. 28, 1965  T. M. GOIKE  3,225,785
SERVO-SYSTEM FOR FLUID FLOW REGULATING VALVES
Filed March 1, 1963  2 Sheets-Sheet 1
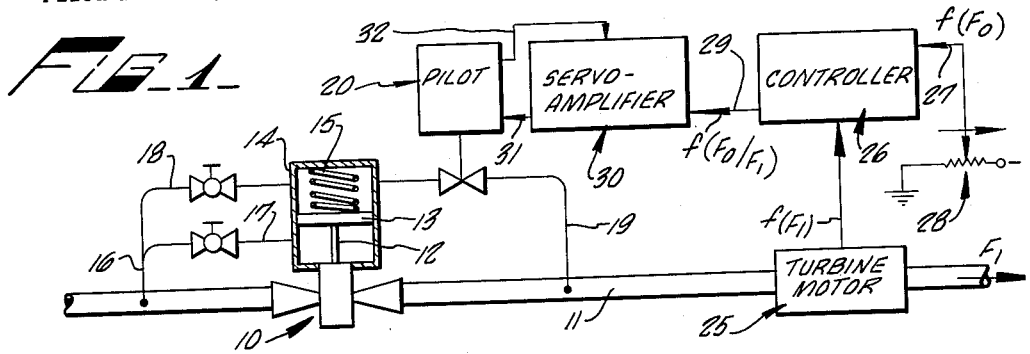
FIG_1_
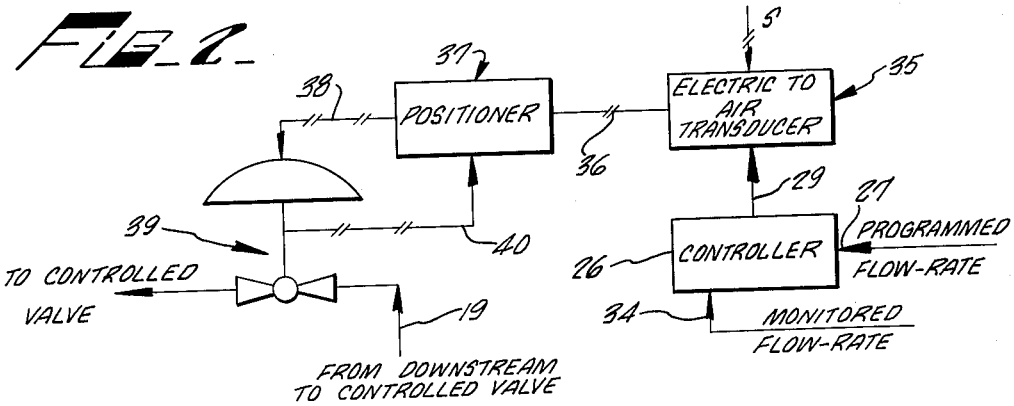
FIG_2_
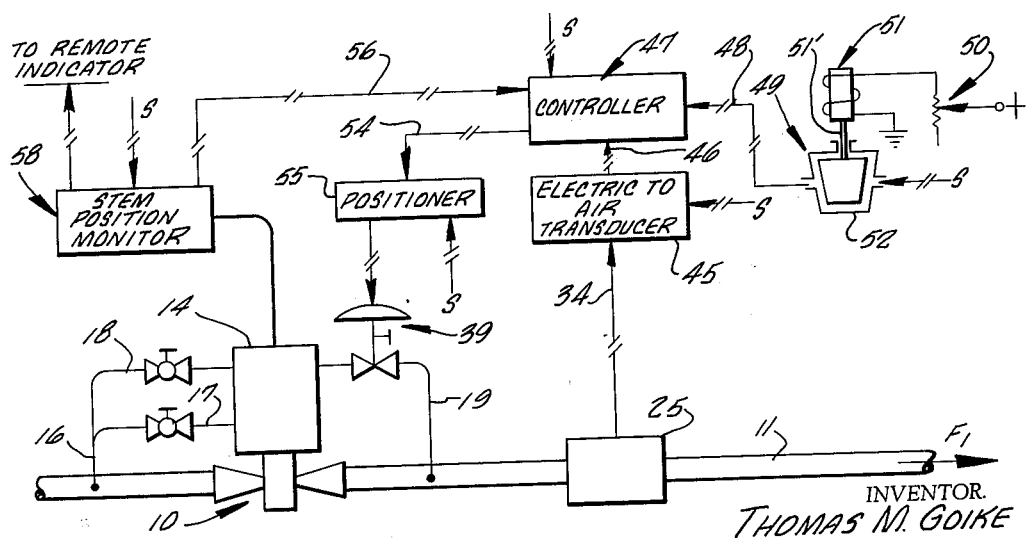
FIG_3_
INVENTOR.
THOMAS M. GOIKE
BY
Christie, Parker & Hale
ATTORNEYS.

INVENTOR.
THOMAS M. GOIKE
BY Christie, Parker & Hale
ATTORNEYS.

United States Patent Office 3,225,785
Patented Dec. 28, 1965

3,225,785
SERVO-SYSTEM FOR FLUID FLOW
REGULATING VALVES
Thomas M. Goike, Trumbull, Conn., assignor to Consolidated Electrodynamics Corporation, Pasadena, Calif., a corporation of California
Filed Mar. 1, 1963, Ser. No. 262,031
4 Claims. (Cl. 137—486)

This invention relates to valving systems, and more particularly to systems for maintaining a predetermined flowrate of a fluid downstream of a fluid regulating valve while the valve is adjusted to compensate for changed conditions in the fluid circulated through the valve.

In both marine and land based installations boiler feedwater control systems require that feedwater input to the boiler closely follow the rate at which steam is extracted from the boiler. In extremely high pressure boiler systems, exact correspondence between feedwater input and steam extraction rates is particularly critical lest pressure and temperature shocks be imparted to the boiler structure. In the past, valving of the feedwater has been controlled by the feedwater itself through a bleed-back connection from downstream of a feedwater control valve to the valve for hydrostatic balancing across a spring loaded piston mechanically connected to the stem of the valve. The bias of the spring on the piston is preset to a value corresponding to a predetermined feedwater flowrate through the valve.

The bleed-back connection often is through a spring loaded pilot valve which regulates the upstream to downstream connection across one side of the control valve piston. In such cases, the setting of the pilot valve is varied in response to changes in pressure differential to modulate the setting of the control valve. Even with pilot valve modulation, however, the control valve hunts or oscillates for undesirably long periods of time about the setting it should assume as the setting of the pilot valve varies in response to changes in the pressure differential. Further, spring loaded valves have slow response characteristics. Also, any variations in the predetermined setting of either the control or pilot valve, to change the downstream flowrate, usually must be accomplished manually. It is thus apparent that existing flow control valves, such as boiler feedwater control valves, do not lend themselves to programmed automatic control.

The problems discussed above are objectionable in simple systems relying upon prior art valve control mechanisms. These problems are compounded to intolerable limits where the fluid flow downstream of a flow regulating valve is supplied to several elements or subsystems, such as to distillation units in a petroleum refinery. Changes in the manner of operation of each distillation unit are reflected at the regulating valve as a change in pressure and, more often than not, as a change in flowrate through the regulating valve. In many cases the devices installed downstream of the regulating valve cannot tolerate slowly damped oscillations in flowrate. As a result, the use of a single prior art valve as the regulating valve means is impractical. Instead, each such device must be separately controlled by its own regulating valve. If prior art valves are used for such purposes, the problem of undesired oscillations is not completely overcome. It is apparent that this materially complicates the piping and valving arrangement of a complex fluid flow system.

United States Patent No. 2,923,316, issued February 2, 1960, to H. L. Paul, Jr. et al., is illustrative of the prior art flow control devices described above. The valve shown in this patent is known as an integral cylinder valve and is useful in high pressure systems since the movable parts in the control valve may be said to be "full floating." That is, the valve is vertically disposed; the weight of all moving parts is substantially balanced by fluid pressure; and the sliding contact between moving parts and the valve casing is essentially a fluid contact.

The present invention provides a system and apparatus for controlling fluid flow regulating valves, such as the valve shown in Patent No. 2,923,316 through the use of a servo-system. The servo controlled valve of the present invention does not oscillate appreciably as its setting is changed to accommodate changes in pressure upstream or downstream of the valve. The invention also assures that the flowrate downstream of the valve is maintained substantially constant while the setting of the control valve is varied. Further, the present invention lends itself readily to control by a computer, either digital or analog, in an automated installation so that flowrates through the valve may be altered according to predetermined schedules.

The inveniton has been referred to in the general context of a boiler feedwater control, but it will be apparent to those skilled in the art that the invention may be used in other contexts and applications.

Generally speaking, the present invention provides apparatus for controlling the adjustment of a fluid flow regulating valve means to maintain a substantially constant fluid flowrate at a location downstream of the valve means while the valve means is adjusted responsive to changed conditions in the fluid circulated through the valve means. The invention includes sensing means downstream of the valve for sensing the actual downstream flowrate to produce an output signal indicative of the rate of fluid flow past the sensing means. Controller means are provided for comparing the sensing means output signal with a signal indicative of a predetermined and desired flowrate to produce a control signal related to the comparison result. The invention also includes means responsive to the control signal for adjusting the valve means to reduce the control signal by matching the flowrate at the sensing means with the desired flowrate. In a preferred form of the invention the means responsive to the control signal includes a pilot valve and a closed servo loop between the controller and the valve means, the valve means including the pilot valve and the control valve directly effective on the circulating fluid.

The above mentioned and other features of the invention are more fully described in the following detailed explanation of the invention taken in conjunction with the accompanying drawings, wherein:

FIG. 1 is a block diagram of a preferred system according to the invention wheerin the closed servo loop exists between the pilot valve and a servo-amplifier connected between the pilot valve and the controller means;

FIG. 2 is a block diagram of a portion of the system shown in FIG. 1 adapted for pneumatic operation between the controller and the pilot valve;

FIG. 3 is a block diagram of a second preferred system according to the present invention wherein the closed servo loop is between the controller, the pilot valve and the control valve;

Figure 4:
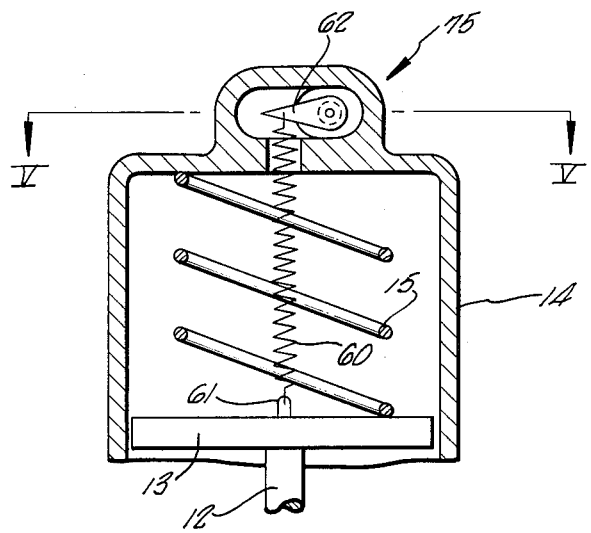
FIG. 4 is a cross-sectional elevation view with parts broken away, of a portion of the integral cylinder valve showing novel means for sensing the adjustment of the control valve.

Referring initially to FIG. 1, an integral cylinder control or regulating valve 10 is installed in a fluid flow conduit 11 which defines a passage through which a regulated fluid circulates. Preferably the regulating valve is a valve according to the invention described and claimed in U.S. Patent No. 2,923,316, although any valve having mechanical actuation, such as a gate valve, globe valve, or rotary disk valve, may be used. A reciprocal valve stem 12 is connected to a valve piston 13 within a cylinder 14 secured to the portion of the valve within which a closure member (not shown) operates in closure relation to the fluid flow passage. A compression spring 15 is biased between the upper surface of the piston and the upper end of the cylinder. Pressure bleed ducts 16 and 19 are provided between opposite sides of the piston to conduit 11 to provide balancing fluid forces on opposite sides of the piston. High pressure duct 16 is connected to conduit 11 upstream of the regulating valve and has branch ducts 17 and 18 connected to the lower and upper portions of the cylinder, respectively. Low pressure duct 19 is connected from the upper portion of the cylinder to the conduit at a location downstream of valve 10. Ducts 17 and 18 include manually selectively operable valve means for fluid flow reguation thereof. Duct 19 is connected to the cylinder 14 by way of a pilot valve 20. The pilot valve may be an "Omnilectric" proportioning valve manufactured by G. W. Dahl Co., Inc., Bristol, Rhode Island.

In FIG. 1 the actual flowrate through conduit 11 downstream of the regulating valve is represented as flow $F_1$. Means are disposed in the conduit downstream of the valve for monitoring the actual flowrate in the conduit. A turbine type flow meter 25, comprising flowrate sensing and monitoring means, is installed in conduit 11 to provide an output signal which is indicative of the actual flowrate $F_1$ monitored by the flow meter means. In a presently preferred embodiment of the invention the value of the meter output signal is proportional to the sensed flowrate. Meter 25 may be a suitable Series 5000 "Pottermeter" manufactured by Potter Aeronautical Corporation, Union, New Jersey.

The output of the meter is introduced to a controller 26 in which the meter output signal is compared with a reference signal 27 having a value related to a desired flowrate $F_0$ in the conduit. Controller 26 may be a C–400 controller manufactured by DeVar-Kinetics Division of Consolidated Electrodynamics Corporation, Bridgeport, Connecticut. The reference signal is introduced into the controller from an external source such as voltage divider 28. On the other hand the reference signal may be preset into the controller. Reference input signal 27 may be of a value proportional to the predetermined desired flowrate in the conduit 11. The controller provides an output control signal having a value related to and indicative of the result of the comparison between the reference and the sensing means output signals and is represented as signal 29. In FIG. 1 the signal 29 is designated as a function of the ratio between reference flowrate $F_0$ and the actual flowrate $F_1$, although it is within the scope of the present invention that the comparison result may indicate a difference between flowrate $F_0$ and $F_1$.

Basically, the output signal 29 from controller 26 is applied to means for controlling the adjustment of the control valve such that the actual flowrate $F_1$ accords with the predetermined flowrate $F_0$ with the result that the value of the control signal is reduced. The mechanism for positioning the valve closure member to accomplish this result is responsive, at least in part, to the output signal from controller 26.

As illustrated in FIG. 1, output signal 29 is introduced to an input of servo-amplifier 30 having an output signal 31. Servo-amplifier 30 may be the actuator which is normally furnished with the Dahl "Omnilectric" proportioning valve, identified above. The output signal 31 in turn is applied to valve means which are responsive to the signal 31 to reposition the closure member of valve 10 to compensate for changes in pressure in conduit 11 upstream or downstream of the valve means. As used herein the term "valve means" includes both regulating or control valve 10 and pilot valve 20. The position of the pilot valve is indirectly related to the position of piston 13 which in turn is directly related to the position of the valve closure member of regulating valve 10. The valve means has a feedback output signal which is related to the position of the valve closure member which, assuming constant fluid flow conditions, is directly related to the predetermined flowrate $F_0$. In the embodiment of the invention illustrated in FIG. 1 pilot valve 20 provides a feedback signal 32 which indirectly represents the adjustment of regulating valve 10. The feedback signal is generated by a position sensitive transducer which may be a differential transformer having an output signal of value related to the position of a selected movable part of the pilot valve. Output signal 32 is introduced to a second input of servo-amplifier 30 so that the servo-amplifier and the pilot valve constitute a closed servo loop in the larger closed servo loop comprised of turbine meter 25, controller 26, and the valve means. It is noted that the second loop relies upon electrical and fluid media to complete the interconnections between the functional units of the system. The feedback signal of pilot valve 20 modulates the controller output signal so that the pilot valve is not over adjusted.

If it is assumed that the fluid flowrate through valve 10 is constant, and that the actual flowrate $F_1$ equals the predetermined desired flowrate $F_0$, signal 29 will be of such a value indicating that the actual and predetermined flowrates equal one another. Accordingly, the pilot valve will be maintained at a constant setting which, in turn, provides that piston 13 of the regulating valve 10 maintains a constant position. The constant position of piston 13 is maintained by a force balance across the piston, the lower side of the piston being connected to the upstream pressure in conduit 11 while the upper side of the piston is exposed to a reduced fluid pressure and to the bias of spring 15. The value of the reduced pressure on the upper side of the piston is determined by the setting of pilot valve 20 which throttles duct 19 in much the same manner as does the pilot valve disclosed in Patent No. 2,923,316, cited above. If a change in pressure occurs in conduit 11, either upstream or downstream of the regulating valve, the flowrate at the flow meter will be changed from predetermined flowrate $F_0$. As a result of the operation of controller 26, signal 29 will have a value indicating a mismatch between flowrates $F_0$ and $F_1$. In response to the change in signal 29 servo-amplifier 30 is operable to change the setting of the regulating valve through pilot valve 20. In particular, the inner closed loop comprising the amplifier 30 and the pilot valve functions to rapidly bring the pilot valve to a new setting which places the regulating valve in a condition such that the actual flowrate again equals the predetermined flowrate.

As mentioned briefly above, the pilot valve of Patent No. 2,923,316 is spring loaded and therefore has a tendency to hunt about its new setting as the pressure differential across the regulating valve is changed. Also, since the regulating valve itself is spring loaded, it tends to hunt or oscillate about a new position indicated by the pilot valve. Since the pilot valve itself encounters oscillations, the oscillations of the regulating valve are amplified such that the flowrate downstream of the regulating valve experiences variations which continue for intolerably long periods of time. Since pilot valve 20 illustrated in FIG. 1 is brought to a new position with little if any oscillations, regulating valve 10 is brought more quickly to its new setting as pressure differentials are manifested across the valve means.

It is noted at this point that the apparatus illustrated in FIG. 1 provides for remote programming of valve 10 through the voltage divider 28. The regulating valve may be used in a system in which, following start up of the system, for example, the desired flowrate through the valve is of a first predetermined value. After a predetermined period of time it may be desired to change the flowrate to a new level. In such a case the value of reference signal 27 introduced into the controller is varied and, according to the operations described above, flowrate $F_1$ is quickly brought to the new level.

It is to be noted that as used herein the term "signal" refers to electrical, hydraulic, pneumatic and mechanical signals.

FIGURE 2 illustrates the system according to FIGURE 1 adapted for operation of the pilot valve by pneumatic signals. Controller 26 has input signals 27 and 34, signal 34 being an electrical signal from an apparatus for sensing the actual flowrate in the valve to be regulated, such as flowmeter 25 shown in FIGURE 1. Output signal 29 is introduced into an electrical-to-air signal transducer 35 (such as a Type 543 electro-pneumatic transducer manufactured by Fisher Governor Company of Marshalltown, Iowa) having a pneumatic output signal 36 indicative of the valve of signal 29 introduced into the transducer. Signal 36 in introduced into a positioner (pneumatic amplifier) 37 (such as a Fisher Governor Company Type 3571 positioner) having an output signal 38 introduced to the actuating mechanism of a pneumatic pilot valve 39. The positioner output signal has a value indicative of transducer output signal 36, as modified by a feedback signal 40 from the pilot valve which is of value correlated to the instantaneous adjustment of the pilot valve. The closed servo loop between positioner 37 and pilot valve 39 is directly analogous to the closed servo loop between servo amplifier 30 and pilot 20 illustrated in FIGURE 1. In FIGURES 2 and 3 the symbols "S" indicate air supply to the pneumatic devices.

FIGURE 3 illustrates a system in which the feedback signal from the valve means is directly from the regulated valve to provide a more positive control over the position of the regulating valve than is provided in the systems illustrated in FIGURES 1 and 2.

In the apparatus of FIGURE 3 the output signal 34 from flowmeter 25 is introduced to an electrical-to-air signal transducer 45 (such as a Fisher Governor Type 543 transducer) having an output signal 46 introduced to a pneumatic controller 47. Controller 47 may be a Model 172 pressure transmitter manufactured by Moore Products Co., Springhouse, Penn. A second input signal 48 is introduced to the controller from a second electrical-to-air signal transducer 49 shown schematically as including a variable resistor 50 connected to a source of positive potential and to ground through the winding of an electromagnet 51. The electromagnet includes an armature 51' connected to a tapered valve member in a needle valve-type air pressure regulating mechanism 52. The controller 47 has an output or control signal 54 which is introduced to a positioner 55 (such as a Fisher Governor Type 3571 positioner) for operation of pneumatic pilot valve 39 disposed in duct 19 of the regulating valve 10. The positioner provides a gain factor which is applied to the signal introduced to the positioner from controller 47.

A pneumatic feedback signal 56, indicative of the position of valve 10, is introduced to the controller for modulation of the result of the comparison between signal 46 and reference signal 48 to provide controller output signal 54. Signal 56 is provided as an output of a valve stem position monitor 58 which is coupled to regulating valve 10 and provides a signal, either electrical, hydraulic, or pneumatic, which is directly related to the position of the closure member of valve 10. A preferred embodiment of monitor 58 is shown in FIGS. 4 and 5 and is described below.

Signal 46 is indicative of what the downstream flowrate actually is, and its value may be related to a condition at a location far removed from valve 10. Signals 46 and 48 are compared in controller 47 to provide a raw output signal which indicates what should be done to pilot valve 39 in order to cause the actual fluid flow rate to follow the desired flowrate. Depending on the particular fluid flow system involved, and considering that head losses and other dynamic effects associated with fluid flow may be significant, the value of signal 46 may be only remotely indicative of the condition which actually exists or should exist at valve 10. Signal 48 indicates what the flowrate at the ultimate source of signal 46 should be. Feedback signal 56, however, indicates the condition of valve 10 at any given instant. The feedback signal, therefore, is used to modulate the raw output signal of the controller to provide output signal 54 which is in terms of what should be done to the pilot valve at that time.

The system shown in FIGURE 3 is generally similar to the systems shown in FIGURES 1 and 2, but is different from these other preferred embodiments of the invention in that the control of valve 10 is faster and tendencies to overcontrol valve 10 are minimized. These advantages result from the feedback signal being directly related to the condition of valve 10 through stem position monitor 58 rather than indirectly through a pilot valve.

Figure 5:
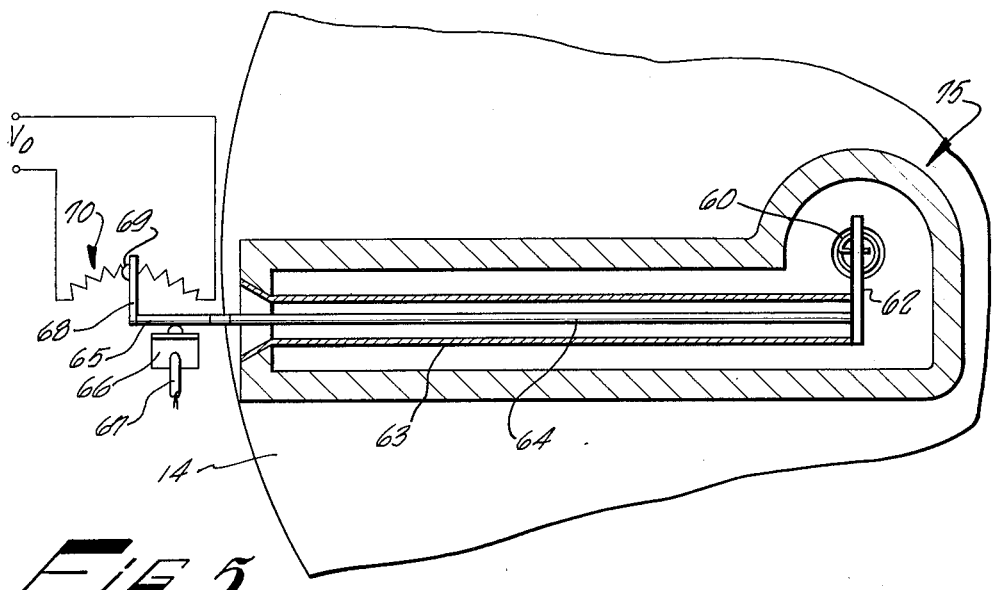
FIG. 5 is an enlarged cross-sectional plan view taken along line V—V of FIG. 4.

FIGURES 4 and 5 illustrate a stem position monitor particularly adapted for use with an integral cylinder valve of the type disclosed in Patent 2,923,316. As mentioned above, piston 13 of the regulating valve is biased downwardly by spring 15. A sensing spring 60 is connected between a lug 61 extending vertically from the upper face of the piston and a torque arm 62 connected to the cantilevered end of a torque tube 63 (see FIGURE 5). The torque tube, with its torque arm, is disposed in an enclosure 75 defined by the upper portion of cylinder 14. The torque tube is an elongated, hollow, thin walled tube having its end opposite from the torque arm mounted to an opening in the enclosure to be secured from angular movement relative to the enclosure at the supported end. The torque arm is secured to the cantilevered end of the torque tube so that the interior of the torque tube is sealed from the cylinder; the supported end of the tube is sealed to the enclosure. A motion transmitting arm 64, preferably disposed concentric to the torque tube, is connected to the torque arm and extends through the torque tube to an unsupported end beyond the location at which the torque tube is mounted to the enclosure. The spring rates of spring 60 and torsion tube 63 are linear over the ranges of deflection encountered in this structure, the extent of such ranges of deflection being dictated by the full range of travel of piston 13. That is to say, as the piston is moved reciprocally in cylinder 14, the load transmitted to torque arm 62 by spring 60 varies linearly and the deflection of the torque tube in response to such loading by the spring is linear. Accordingly, arm 64 experiences angular movement directly related to the movement of the piston in cylinder 14.

The unsupported end of arm 64 is fabricated from a length of electrically conductive material 65 engaged by a wiper 66 having an electrical signal output conductor 67 connected thereto. A signal pick-off arm 68, having an electrical contact 69 at its end remote from arm 64, is connected to the electrically conductive portion of arm 64. The pick-off arm is engaged with a potentiometer resistance winding 70, for example, to provide an electrical output through conductor 67 which is indicative of the position of the piston which is connected mechanically to the valve closure member of regulating valve 10. This output may be fed directly to a servo-amplifier or to the controller in an electrical system analogous to that shown in FIGURE 3, or the output may be converted to a pneumatic signal for application as shown in FIGURE 3. It is apparent that other mechanisms may be used to provide the stem position monitor function disclosed in FIGURE 3. For example, a portion of valve stem 12 may define the core of a differential transformer for cooperation with a differential transformer winding mounted in the supporting structure of the regulating valve. Other apparatus for providing an output signal of value related to the position of the valve stem of the regulating valve will be apparent to those skilled in the art.

The foregoing description has set forth apparatus for controlling the fluid flowrate through an adjustable regulating valve means to automatically maintain a predetermined selectively controllable flowrate downstream from the valve means. This is achieved by providing a signal which is indicative of the actual flowrate downstream of the regulating valve. This signal is compared with a preselected signal indicative of the desired downstream flowrate and a control signal representing the result of such comparison is provided. The control signal is introduced to the valve means to adjust the fluid flowrate therethrough to cause the value of the downstream flowrate to follow the desired preselected flowrate value.

While the invention has been described above in conjunction with specific apparatus, this is not to be considered as limiting the scope of the present invention since the foregoing description has been by way of example and illustration with respect to presently preferred embodiments of the invention.

What is claimed is:
1. A fluid flow control system comprising
 (a) an adjustable fluid flow control valve disposed in a fluid flow conduit and having a piston reciprocable in a cylinder, the position of the piston in the cylinder determining the flow control adjustment of the control valve,
 (b) pressure balance duct means to the cylinder from the conduit upstream and downstream of the control valve,
 (c) a pilot valve in the duct means for regulating the adjustment of the control valve,
 (d) a flowmeter in the conduit downstream of the control valve for monitoring the actual downstream flowrate and producing an electrical output signal indicative of the actual downstream flowrate,
 (e) an electrical-to-air signal transducer having the flowmeter output signal as an input and producing a pneumatic output signal related to its input,
 (f) a pneumatic controller for comparing the transducer output signal with a reference signal indicative of a desired downstream flowrate and producing a pneumatic control signal indicative of the comparison result,
 (g) means for supplying the control signal to the pilot valve for control thereof to regulate the adjustment of the control valve so that the actual downstream flowrate follows the desired flowrate, and
 (h) means coupled to the control valve for sensing the adjustment of the control valve and producing a pneumatic feedback signal, and
 (i) means for supplying the feedback signal to the controller.

2. A fluid flow control system according to claim 1 including means coupled to the controller for varying the value of the reference signal.

3. In a fluid flow control system including an integral cylinder control valve disposed in a fluid flow conduit for regulating the flow of fluid through the conduit principally in response to the pressures existing upstream and downstream of said valve in fluid in the conduit, the valve including a resiliently biased piston disposed in a cylinder and reciprocable therein in response to force unbalance thereacross, pressure balance ducts connected from the conduit upstream of the valve to opposite ends of the cylinder and from the conduit downstream of the valve to one end of the cylinder, and a pilot valve disposed in one of the ducts communicating with said one end of the cylinder for varying the fluid pressures presented to opposite ends of the piston thereby to regulate the adjustment of the control valve, means for maintaining a selected fluid flowrate in the conduit downstream of said control valve comprising, in combination,
 (a) sensing means in the conduit downstream of the control valve for producing an electrical output signal indicative of the actual downstream flowrate,
 (b) means for producing a reference signal having a value related to the selected flowrate,
 (c) controller means for comparing the sensing means output signal with the reference signal and for producing a control signal having a value related to the result of the comparison,
 (d) means for applying the control signal to the pilot valve for operating the pilot valve in response to varitions in the value of the control signal to vary the position of the piston in said cylinder, and
 (e) means for generating a feedback signal indicative of the instantaneous condition of the control valve and for applying the feedback signal to modulate the control signal.

4. Apparatus for controlling the rate at which a fluid flows through a conduit in a fluid flow system comprising, in combination,
 (a) valve means in the conduit operable principally in response to pressures existing upstream and downstream thereof in fluid in the conduit for varying the rate of fluid flow through the conduit including:
  (1) a control valve disposed in the conduit,
  (2) a cylinder and a spring-loaded piston reciprocably mounted therein, the piston being coupled to the control valve for operation of the control valve in response to movement of the piston,
  (3) pressure balance duct means connected to the cylinder adjacent opposite sides of the piston and to the conduit upstream and downstream of the control valve, and
  (4) a pilot valve in the pressure balance duct means for regulating the communication of pressure between one side of the piston and the conduit to regulate operation of the control valve,
 (b) a flowmeter disposed in the conduit downstream of the control valve for monitoring the actual downstream flowrate and for producing an output signal having a value indicative of said actual downstream flowrate,
 (c) a controller to which the flowmeter output signal is applied for comparing the flowmeter output signal with a reference signal indicative of a desired downstream flowrate and for producing a control signal indicative of the comparison result,
 (d) means for supplying the control signal to the pilot valve for control thereof to regulate the adjustment of the control valve so that the actual downstream flowrate follows the desired flowrate, and
 (e) means coupled between the valve means and the controller for generating a feedback signal indicative of the setting of the valve means and applying the feedback signal to modulate the control signal in relation to the value of the feedback signal.

References Cited by the Examiner
UNITED STATES PATENTS

| 1,827,560 | 10/1931 | Binckley | 74—18.1 |
| 2,509,295 | 5/1950 | Glass | 137—487.5 XR |
| 2,923,316 | 2/1960 | Paul et al. | 137—489.3 |
| 3,015,768 | 1/1962 | Hornfeck et al. | 137—487.5 XR |

FOREIGN PATENTS 451,486   9/1948   Canada.

M. CARY NELSON, *Primary Examiner.*

MARTIN P. SCHWADRON, *Examiner.*